(12) United States Patent
Chang

(10) Patent No.: US 10,587,436 B2
(45) Date of Patent: Mar. 10, 2020

(54) SIGNAL TRANSMITTER DEVICE, DETECTION CIRCUIT, AND SIGNAL DETECTION METHOD THEREOF

(71) Applicant: Realtek Semiconductor Corporation, Hsinchu (TW)

(72) Inventor: Yuan-Shuo Chang, Hsinchu (TW)

(73) Assignee: REALTEK SEMICONDUCTOR CORPORATION, Hsinchu (TW)

(*) Notice: Subject to any disclaimer, the term of this patent is extended or adjusted under 35 U.S.C. 154(b) by 74 days.

(21) Appl. No.: 16/103,193

(22) Filed: Aug. 14, 2018

(65) Prior Publication Data

US 2019/0173694 A1 Jun. 6, 2019

(30) Foreign Application Priority Data

Dec. 6, 2017 (TW) .............................. 106142786 A

(51) Int. Cl.
*H04L 25/02* (2006.01)
*H04L 27/36* (2006.01)

(52) U.S. Cl.
CPC ...... *H04L 25/0228* (2013.01); *H04L 25/0222* (2013.01); *H04L 27/367* (2013.01)

(58) Field of Classification Search
CPC ............. H04L 25/0222; H04L 25/0228; H04L 27/367
See application file for complete search history.

(56) References Cited

U.S. PATENT DOCUMENTS

| 7,855,666 B1 | 12/2010 | Kopikare et al. |
| 8,280,327 B2 | 10/2012 | Hsu et al. |
| 8,300,735 B2 | 10/2012 | Lin |
| 9,749,172 B2* | 8/2017 | Chang ................... H04L 27/364 |
| 10,374,643 B2* | 8/2019 | Wang ................... H04L 27/0014 |
| 2009/0088117 A1 | 4/2009 | Hsu et al. |

FOREIGN PATENT DOCUMENTS

TW I530134 B 4/2016

OTHER PUBLICATIONS

A Highly Linear Direct-Conversion Transmit Mixer Transconductance Stage with Local Oscillation Feedthrough and I/Q Imbalance Cancellation Scheme, IEEE International Solid-State Circuits Conference, 2006, Digest of Technical Papers.

* cited by examiner

*Primary Examiner* — Nader Bolourchi
(74) *Attorney, Agent, or Firm* — Locke Lord LLP; Tim Tingkang Xia, Esq.

(57) ABSTRACT

A signal transmitter device includes a transmitter and a detection circuit. The transmitter is configured to transmit an output signal based on a first baseband signal and a second baseband signal, in which the first baseband signal and the second baseband signal have a baseband frequency. The detection circuit is configured to perform twice signal modulations according to the output signal to detect a signal component, which has the baseband frequency, of the output signal, in order to control a compensation circuit to correct a channel mismatch of the transmitter.

20 Claims, 4 Drawing Sheets

SIGNAL TRANSMITTER DEVICE, DETECTION CIRCUIT, AND SIGNAL DETECTION METHOD THEREOF

CROSS-REFERENCE TO RELATED APPLICATION

This application claims priority to Taiwan Application Serial Number 106142786, filed Dec. 6, 2017, which is herein incorporated by reference.

BACKGROUND

Technical Field

The present disclosure relates to a signal transmitter device. More particularly, the present disclosure relates to a detection circuit of the signal transmitter device and a detection method thereof.

Description of Related Art

Circuits for communication application have been widely used in various electronic devices. In order to transmit or receive data correctly, a mismatch between channels of a transceiver circuit should be corrected. In current approaches, a detection circuit is employed in a mechanism for correcting the channel mismatch of a transmitter to detect an output signal of the transmitter, in order to determine whether the mechanism operates properly. However, with increasing in the operating frequency, requirements of the detection circuit become higher. As a result, implementations of the detection circuit become difficult and a power consumption of the detection circuit is increased.

SUMMARY

To address at least problem discussed above, in some aspects, the disclosure provides a signal transmitter device. The signal transmitter device includes a transmitter and a detection circuit. The transmitter is configured to transmit an output signal based on a first baseband signal and a second baseband signal, in which the first baseband signal and the second baseband signal have a baseband frequency. The detection circuit is configured to perform twice signal modulations according to the output signal to detect a signal component, which has the baseband frequency, of the output signal, in order to control a compensation circuit to correct a channel mismatch of the transmitter.

In some aspects, the disclosure provides a detection circuit configured to detect an output signal of a transmitter. The detection circuit includes a first mixer, a first filter, and a second mixer. The first mixer is configured to perform a first square operation according to the output signal, in order to generate a first processed signal. The first filter is configured to perform a first filtering operation according to the first processed signal, in order to generate a second processed signal. The second mixer is configured to perform a second square operation according to the second processed signal, in order to generate a third processed signal, in which the third processed signal is further processed by a compensation circuit, in order to correct a channel mismatch of the transmitter.

In some aspects, the disclosure provides a signal detection method that includes following operations: performing, by a first mixer, a first signal modulation according to an output signal of a transmitter, in order to generate a first processed signal; performing, by a first filter, a first filtering operation according to a first processed signal, in order to generate a second processed signal; and performing, by a second mixer, a second signal modulation according to the second processed signal, in order to generate a third processed signal, in which the third processed signal is processed by a compensation circuit, in order to correct a channel mismatch of the transmitter.

As described above, the signal transmitter device and the detection method in the present disclosure are able to perform twice signal modulations on the output signal of the transmitter, in order to reduce requirements for the detection circuit.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

In this document, the term "coupled" may also be termed as "electrically coupled", and the term "connected" may be termed as "electrically connected". "Coupled" and "connected" may also be used to indicate that two or more elements cooperate or interact with each other.

Figure 1:
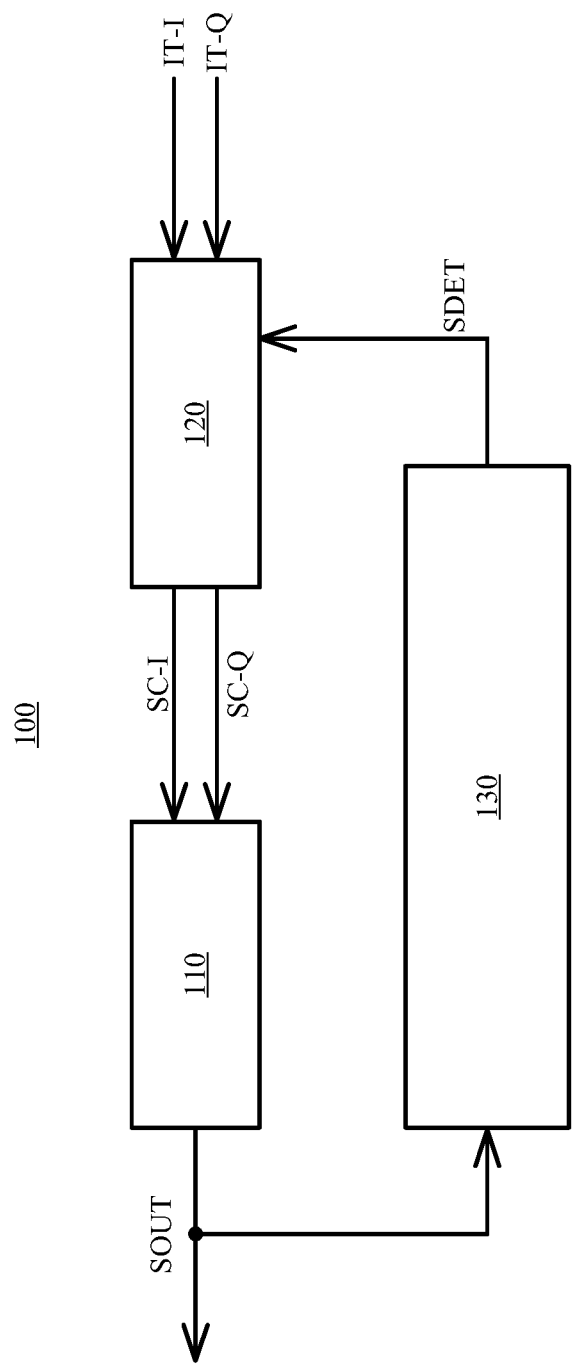
FIG. 1 is a schematic diagram of a signal transmitter device according to some embodiments of the present disclosure.

Reference is made to FIG. 1. FIG. 1 is a schematic diagram of a signal transmitter device 100 according to some embodiments of the present disclosure. The signal transmitter device 100 includes a transmitter 110, a compensation circuit 120, and a detection circuit 130.

The transmitter 110 is configured to transmit an output signal SOUT based on a baseband signal IT-I and a baseband signal IT-Q. The baseband signal IT-I and the baseband signal IT-Q have a baseband frequency fm. Ideally, the baseband signal IT-I and the baseband signal IT-Q are different in phase by about 90 degrees.

The compensation circuit 120 is configured to correct the baseband signal IT-I and the baseband signal IT-Q based on the detection signal SDET, in order to compensate a mismatch between an in-phase signal channel and a quadrature signal channel of the transmitter 110. For example, the compensation circuit 120 is configured to adjust the baseband signal IT-I and the baseband signal IT-Q based on the detection signal SDET, in order to output a correction signal SC-I and a correction signal SC-Q to the transmitter 110. As a result, the transmitter 110 may transmit the output signal SOUT according to the correction signal SC-I and the correction signal SC-Q.

In some embodiments, the compensation circuit 120 may determine a direction for adjusting the channel mismatch and may generate one or more compensation coefficients correspondingly, in order to process the baseband signal IT-I and the baseband signal IT-Q. In some embodiments, the compensation circuit 120 is implemented with a multiplier and an adder, in order to process the baseband signal IT-I and the baseband signal IT-Q according to the one or more compensation coefficients. The above arrangements are given for illustrative purposes, and various arrangements able to correct the channel mismatch of the transmitter 110 are within the contemplated scope of the present disclosure.

The detection circuit 130 is configured to perform twice signal modulations according to the output signal SOUT to detect a signal component having the baseband frequency fm of the output signal SOUT, and to output a corresponding detection signal SDET to the compensation circuit 120. The related descriptions will be given in the following paragraphs with reference to FIGS. 2-3.

Figure 2:
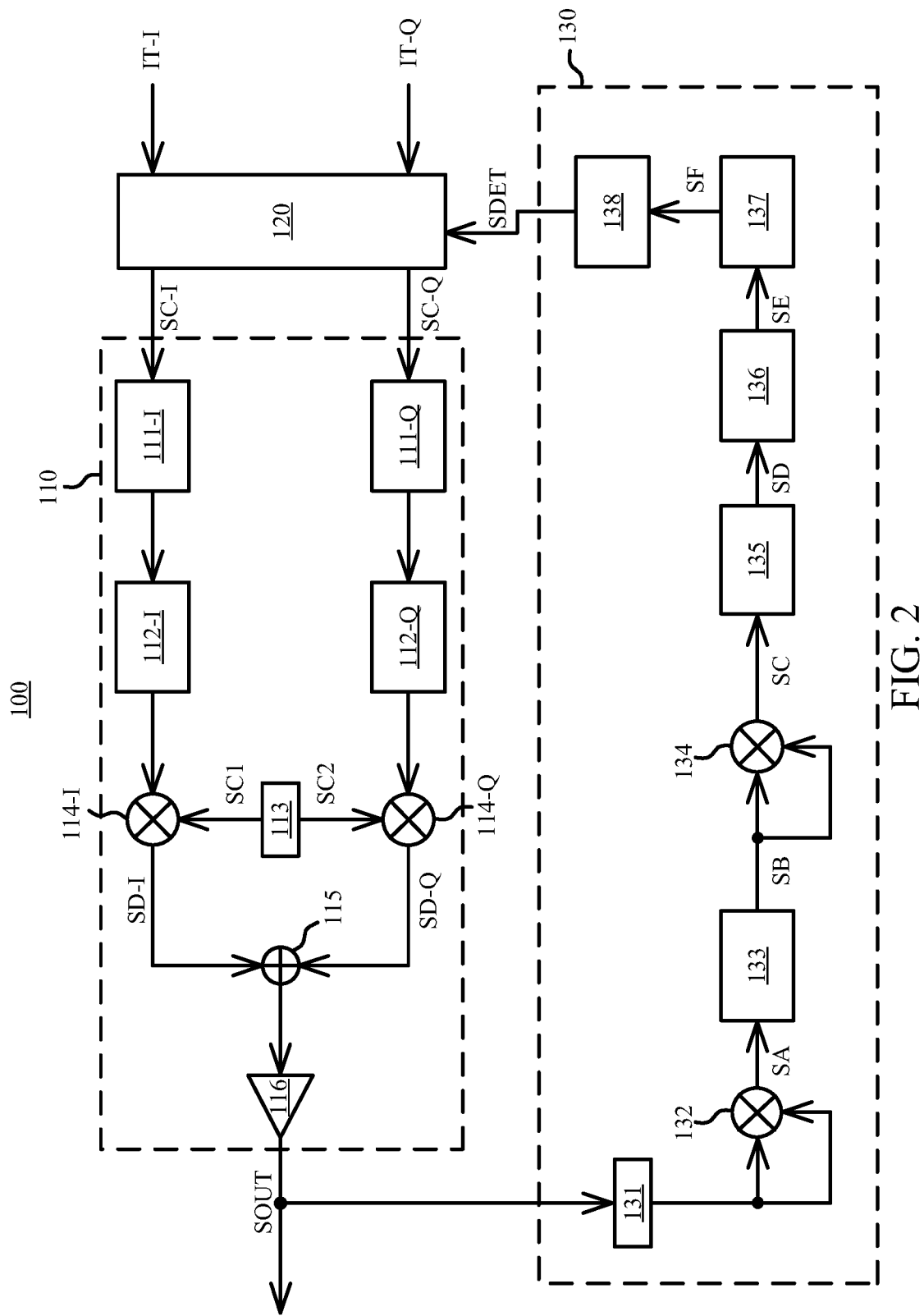
FIG. 2 is a schematic diagram of the signal transmitter device in FIG. 1 according to some embodiments of the present disclosure.
Figure 3:
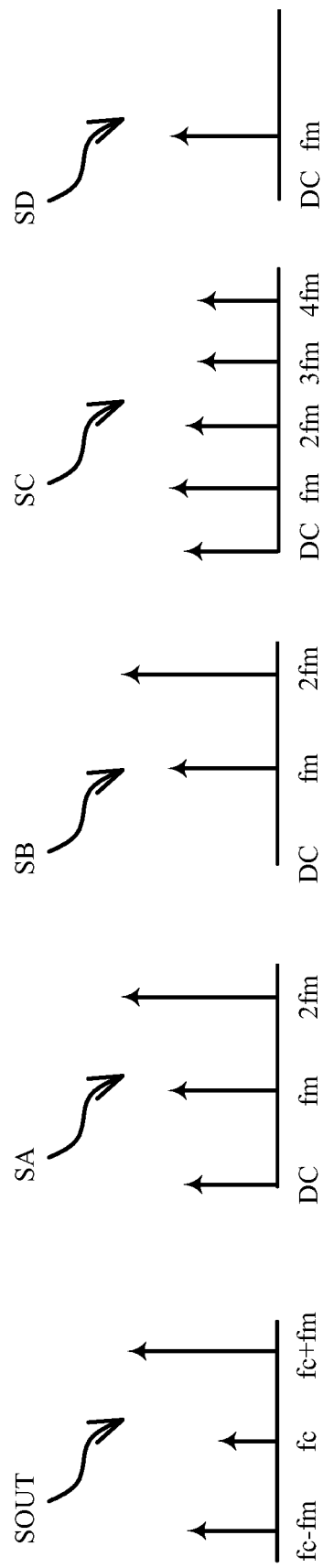
FIG. 3 is a schematic diagram illustrating spectrums of the signals in FIG. 2, according to some embodiments of the present disclosure.

Reference is made to FIGS. 2-3. FIG. 2 is a schematic diagram of the signal transmitter device 100 in FIG. 1 according to some embodiments of the present disclosure. FIG. 3 is a schematic diagram illustrating spectrums of the signals SOUT and SA-SD in FIG. 2, according to some embodiments of the present disclosure. For ease of understanding, like elements in FIG. 2 are designated with the same reference number with respect to FIG. 1.

As shown in FIG. 2, the transmitter 110 includes digital-to-analog converters (DACs) 111-I and 111-Q, low-pass filters 112-I and 112-Q, a local oscillator 113, mixers 114-I and 114-Q, an adder 115, and a driver 116.

The local oscillator 113 is configured to generate a carrier signal SC1 and a carrier signal SC2 to the mixers 114-I and 114-Q, respectively. The carrier signal SC1 and the carrier signal SC2 have a carrier frequency fc and are different in phase by about 90 degrees. Equivalently, the DAC 111-I, the low-pass filter 112-I, and the mixer 114-I form the in-phase signal channel of the transmitter 110, and the DAC 111-Q, the low-pass filter 112-Q, and the mixer 114-Q form the quadrature signal channel of the transmitter 110.

The correction signal SC-I is processed by the DAC 111-I, the low-pass filter 112-I, and the mixer 114-I, in order to be converted into a modulated signal SD-I. The correction signal SC-Q is processed by the DAC 111-Q, the low-pass filter 112-Q, and the mixer 114-Q, in order to be converted into a modulated signal SD-Q. The adder 115 sums up the modulated signal SD-I and the modulated signal SD-Q, and outputs a signal to subsequent circuits (which includes, for example, the driver 116 and/or an amplifier and an antenna (not shown)), in order to emit the output signal SOUT.

As shown in FIG. 3, if a mismatch is present between the in-phase signal channel and the quadrature signal channel of the transmitter, three signal components can be measured when observing the output signal SOUT at the output of the driver 116, in which the three signal components have frequencies fc−fm, fc, and fc+fm, respectively. As described above, the input signals IT-I and IT-Q have the baseband frequency fm and are different in phase by about 90 degrees, and the oscillating signals SC1 and SC2 having the frequency fc and are different in phase by about 90 degrees. Under this condition, the output signal SOUT can be derived as the following equation:

$$SOUT = A_{sig} \cos[2\pi \times (fc+fm) \times t] + A_{Lo} \cos[2\pi \times fc \times t] + A_{img} \cos[2\pi \times (fc-fm) \times t]$$

where $A_{sig}$ is an amplitude associated with the input signal IT-I and/or the input signal IT-Q, $A_{Lo}$ is an amplitude associated with the oscillating signal SC1 and/or the oscillating signal SC2, and $A_{img}$ is an amplitude associated with an image signal. In FIG. 3, the signal component having the frequency fc−fm is the image signal, the signal component having the frequency fc+fm is a signal to be transmitted, and the signal component having the frequency fc is a leakage signal from the local oscillator 113. In general, the image signal is referred to as an interference introduced from the channel mismatch of the transmitter 110. In some embodiments, by observing the power of the image signal, it is able to determine whether the channel mismatch of the transmitter 110 is properly corrected.

With continued reference to FIG. 2, the detection circuit 130 includes an attenuator 131, a mixer 132, a filter 133, a mixer 134, a filter 135, an amplifier 136, an analog-to-digital converter (ADC) 137, and a power analyzer circuit 138.

The attenuator 131 is configured to reduce the power of the output signal SOUT. The mixer 132 is coupled to the attenuator 131 to receive the reduced output signal SOUT. The mixer 132 modulates the reduced output signal SOUT according to the received output signal SOUT, in order to generate a processed signal SA. Equivalently, the mixer 132 is configured to perform a square operation on the output signal SOUT to generate the processed signal SA. For example, the processed signal SA may be derived as following equation:

$$SA = DC + A_{sig}A_{img} \cos[2\pi \times 2fm \times t] + A_{sig}A_{Lo} \cos[2\pi \times fm \times t] + HF$$

where DC indicates a DC signal component introduced from the mixer 132, HF indicates signal components having high frequency (which is, for example, higher than 2fc). As the frequency of the high frequency signal component HF is too high, this signal component HF is easy to be filtered by subsequent circuits (which at least include, for example, the filter 135). Accordingly, for ease of understanding, FIG. 3 only illustrates the DC signal component DC, the signal component having the baseband frequency fm, and the signal component having the frequency 2fm.

With continued reference to FIG. 2, the filter 133 is configured to filter the processed signal SA to generate a processed signal SB. In some embodiments, the filter 133 is a high-pass filter for filtering low frequency components (which include, for example, the DC signal component DC) of the processed signal SA. As shown in FIG. 3, after being processed by the filter 133, the DC signal component signal DC of the processed signal SB is filtered. In this example, the processed signal SB may be derived as the following equation:

$$SB = A_{sig}A_{img} \cos[2\pi \times 2fm \times t] + A_{sig}A_{Lo} \cos[2\pi \times fm \times t]$$

With continued reference to FIG. 2, the mixer 134 is coupled to the filter 133 to receive the processed signal SB. The mixer 134 modulates the processed signal SB according to the processed signal SB, in order to generate a processed signal SC. Equivalently, the mixer 134 is configured to perform a square operation on the processed signal SB, in order to generate the processed signal SC. For example, the processed signal SC may be derived as the following equation:

$$SC = DC + A_{sig}A_{Lo}A_{sig}A_{img}\cos[2\pi \times fm \times t] + (A_{sig}A_{Lo})^2\cos[2\pi \times 2fm \times t] +$$
$$A_{sig}A_{Lo}A_{sig}A_{img}\cos[2\pi \times 3fm \times t] + (A_{sig}A_{img})^2\cos[2\pi \times 4fm \times t]$$

Accordingly, as shown in FIG. 3, the processed signal SC includes the DC signal component DC, the signal component having the baseband frequency fm, the signal component having the frequency 2fm, the signal component having the frequency 3fm, and the signal component having the frequency 4fm. In the above equation, the signal component having the baseband frequency fm includes the amplitude Aimg associated with the image signal. Thus, if the power of the signal component having the baseband frequency fm approaches zero, it indicates that the image signal is removed. Therefore, it is able to observe the signal component having the baseband frequency fm, in order to determine whether the channel mismatch of the transmitter 110 is properly corrected by the compensation circuit 120.

In some embodiments, the mixer 132 and the mixer 134 may be implemented with active circuits and/or passive circuits. For example, the mixer 132 and the mixer 134 may be implemented with active circuit including one or more transistors. Alternatively, the mixer 132 and the mixer 134 may be implemented with passive circuits including one or more inductive components and/or capacitive components. In some arrangements, if the mixer 132 and the mixer 134 are implemented with passive circuit(s), a power consumption of the detection circuit 130 can be further reduced.

The filter 135 is configured to filter the processed signal SC, in order to generate a processed signal SD. In some embodiments, the filter 135 is a low-pass filter for filtering high frequency signal components (which is, for example, signal components having frequency higher than 2fm) of the processed signal SC. As shown in FIG. 3, after being processed by the filter 135, high frequency signal components of the processed signal SD are filtered.

With continued reference to FIG. 2, the amplifier 136 is configured to amplify the processed signal SD to generate a processed signal SE. The amplifier 136 is able to increase the power of the processed signal SD, in order to increase a signal-to-noise ratio of the signal component having the baseband frequency fm. In some embodiments, the amplifier 136 is a variable gain amplifier. For example, the amplifier 136 may be implemented with a programmable gain amplifier. In some embodiments, the filter 135 and the amplifier 136 may be integrated as a single circuit. Alternatively, in some embodiments, the detection circuit 130 may operate without employing the amplifier 136. The above arrangements are given for illustrative purposes, and the present disclosure is not limited thereto.

The ADC 137 is coupled to the amplifier 136 to receive the processed signal SE. The ADC 137 is configured to convert the processed signal SE into a corresponding digital signal SF. The power analyzer circuit 138 is configured to analyze the digital signal SF, in order to acquire the power of the signal component having the baseband frequency fm and to output the detection signal SDET correspondingly. In some embodiments, the power analyzer circuit 138 may be implemented with a processor, a digital circuit, or an application-specific integrated circuit that performs power spectral density estimation. In some embodiments, the power spectral density estimation may be implemented with operations, which include, for example, fast Fourier transform (FFT). Alternatively, in some other embodiments, the power analyzer circuit 138 may be implemented with algorithms (e.g., FFT) or software that performs the power spectral density estimation. Various implementations of the power analyzer circuit 138 are within the contemplated scope of the present disclosure.

In some embodiments, if the detected power of the signal component having the baseband frequency fm is higher than a predetermined value, the power analyzer circuit 138 outputs the detection signal SDET having a first logic state (e.g., logic 1). Alternatively, if the detected power of the signal component having the baseband frequency fm is lower than a predetermined value, the power analyzer circuit 138 outputs the detection signal SDET having a second logic state (e.g., logic 0). With this arrangement, the compensation circuit 120 is able to determine the direction of correction according to the logic state of the detection signal SDET. The above configuration is given for illustrative purposes, and various configurations of the power analyzer circuit 138 are within the contemplated scope of the present disclosure.

In some related approaches, a single signal modulation is employed to process the output signal of the transmitter, in order to detect the power of the image signal. In these approaches, it is required to measure the signal component having the frequency 2fm to detect the image signal. In other words, the signal component to be measured in these approaches has higher frequency. As a result, the requirement of the bandwidth of ADC becomes higher, the ADC is difficult to be implemented, and the power consumption of the overall circuit is increased.

Compared with these approaches, twice signal modulations are employed in the present disclosure to detect the power of the image signal. As described above, in the present disclosure, the signal component having the frequency fm is measured to detect the image signal. By comparison, the signal component to be measured having lower frequency. As a result, the requirement of the bandwidth of the ADC 137 can be lower. For example, compared with these approaches, the bandwidth of the ADC 137 may be lower than the double of the baseband frequency fm. Accordingly, the ADC 137 is easier to be implemented.

Figure 4:
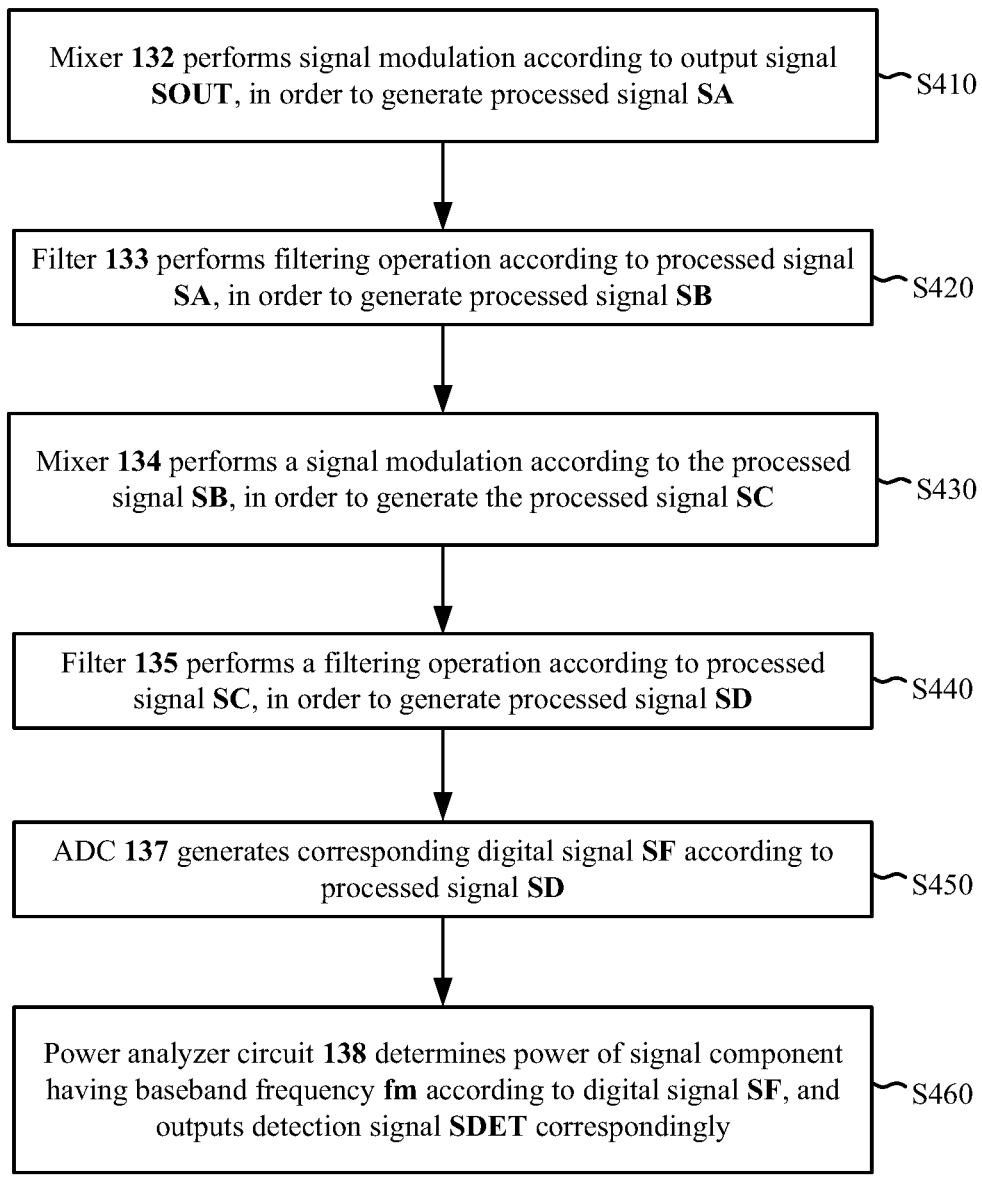
FIG. 4 is a flow chart of a signal detection method according to some embodiments of the present disclosure.

Reference is made to FIG. 4. FIG. 4 is a flow chart of a signal detection method 400, according to some embodiments of the present disclosure. For ease of understanding, reference is also made to FIG. 2 in order to illustrate related operations of the detection circuit 130. In some embodiments, the signal detection method 400 includes operations S410, S420, S430, S440, S450, and S460.

In operation S410, the mixer 132 performs a signal modulation according to the output signal SOUT, in order to generate the processed signal SA. In operation S420, the filter 133 performs a filtering operation according to the processed signal SA, in order to generate the processed signal SB.

For illustration, as shown in FIG. 2, the mixer 132 is coupled to the attenuator 131 to receive the reduced output signal SOUT, and modulates the reduced output signal SOUT according to the received output signal SOUT, in order to generate the processed signal SA. The filter 133 filters the low frequency signal components of the processed signal SA to generate the processed signal SB.

With continued reference to FIG. 4, in operation S430, the mixer 134 performs a signal modulation according to the processed signal SB, in order to generate the processed signal SC. In operation S440, the filter 135 performs a filtering operation according to the processed signal SC, in order to generate the processed signal SD.

For illustration, as shown in FIG. 2, the mixer 134 modulates the processed signal SB according to the received processed signal SB, in order to generate the processed signal SC. The filter 135 filters high frequency signal components of the processed signal SC to generate the processed signal SD.

With continued reference to FIG. 4, in operation S450, the ADC 137 generates a corresponding digital signal SF according to the processed signal SD. In operation S460, the power analyzer circuit 138 determines the power of the signal component having the baseband frequency fm according to the digital signal SF, and outputs the detection signal SDET correspondingly.

For illustration, as shown above, the ADC 137 receives the amplified the processed signal SD (i.e., the processed signal SE) from the amplifier 136, and generates the corresponding digital signal SF to the power analyzer circuit 138. The power analyzer circuit 138 analyzes the power of the signal component having the baseband frequency fm, and outputs the detection signal SDET having a corresponding logic state. As a result, the compensation circuit 120 is able to adjust the channel mismatch of the transmitter 110 according to the detection signal SDET.

The above description of the signal detection method 400 includes exemplary operations, but the operations of the signal detection method 400 are not necessarily performed in the order described above. The order of the operations of the signal detection method 400 can be changed, or the operations can be executed simultaneously or partially simultaneously as appropriate, in accordance with the spirit and scope of various embodiments of the present disclosure.

As described above, the signal transmitter device and the detection method in the present disclosure are able to perform twice signal modulations on the output signal of the transmitter, in order to reduce requirements for the detection circuit.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A signal transmitter device, comprising:
a transmitter configured to transmit an output signal based on a first baseband signal and a second baseband signal, wherein the first baseband signal and the second baseband signal have a baseband frequency; and
a detection circuit configured to perform twice signal modulations according to the output signal to detect a signal component, which has the baseband frequency, of the output signal, in order to control a compensation circuit to correct a channel mismatch of the transmitter.

2. The signal transmitter device of claim 1, wherein the detection circuit comprises:
a first mixer configured to modulate the output signal according to the output signal, in order to generate a first processed signal;
a first filter configured to perform a first filtering operation according to the first processed signal, in order to generate a second processed signal; and
a second mixer configured to modulate the second processed signal according to the second processed signal, in order to generate a third processed signal.

3. The signal transmitter device of claim 2, wherein the twice signal modulations are twice square operations, the first mixer performs a first square operation of the twice square operations, and the second mixer performs a second square operation of the twice square operations.

4. The signal transmitter device of claim 2, wherein the detection circuit further comprises:
a second filter configured to perform a second filtering operation according to the third processed signal, in order to generate a fourth processed signal;
an analog-to-digital converter configured to generate a digital signal according to the fourth processed signal; and
a power analyzer circuit configured to analyze the digital signal to generate a detection signal for controlling the compensation circuit.

5. The signal transmitter device of claim 4, wherein the first filter is a high-pass filter, and the second filter is a low-pass filter.

6. The signal transmitter device of claim 4, wherein a bandwidth of the analog-to-digital converter is lower than a double of the baseband frequency.

7. The signal transmitter device of claim 4, wherein the detection circuit further comprises:
an amplifier configured amplify the fourth processed signal,
wherein the analog-to-digital converter is further configured to generate the digital signal according to the amplified fourth processed signal.

8. The signal transmitter device of claim 7, wherein the amplifier is a variable gain amplifier.

9. A detection circuit configured to detect an output signal of a transmitter, the detection circuit comprising:
a first mixer configured to perform a first square operation according to the output signal, in order to generate a first processed signal;
a first filter configured to perform a first filtering operation according to the first processed signal, in order to generate a second processed signal; and
a second mixer configured to perform a second square operation according to the second processed signal, in order to generate a third processed signal,
wherein the third processed signal is further processed by a compensation circuit, in order to correct a channel mismatch of the transmitter.

10. The detection circuit of claim 9, further comprising:
a second filter configured to perform a second filtering operation according to the third processed signal, in order to generate a fourth processed signal;
an analog-to-digital converter configured to generate a digital signal according to the fourth processed signal; and
a power analyzer circuit configured to analyze the digital signal, in order to generate a detection signal for controlling the compensation circuit.

11. The detection circuit of claim 10, wherein the output signal comprises a signal component having a baseband frequency, and a bandwidth of the analog-to-digital converter is lower than a double of the baseband frequency.

12. The detection circuit of claim 10, further comprising:
an amplifier configured amplify the fourth processed signal,
wherein the analog-to-digital converter is further configured to generate the digital signal according to the amplified fourth processed signal.

13. The detection circuit of claim 12, wherein the amplifier is a variable gain amplifier.

14. The detection circuit of claim 10, wherein the first filter is a high-pass filter, and the second filter is a low-pass filter.

15. A signal detection method, comprising:
performing, by a first mixer, a first signal modulation according to an output signal of a transmitter, in order to generate a first processed signal;
performing, by a first filter, a first filtering operation according to a first processed signal, in order to generate a second processed signal; and
performing, by a second mixer, a second signal modulation according to the second processed signal, in order to generate a third processed signal,
wherein the third processed signal is processed by a compensation circuit, in order to correct a channel mismatch of the transmitter.

16. The signal detection method of claim 15, wherein the first filter is a high-pass filter.

17. The signal detection method of claim 15, further comprising:

performing, by a second filter, a second filtering operation according to the third processed signal, to generate a fourth processed signal;
generating, by an analog-to-digital converter, a digital signal according to the fourth processed signal; and
analyzing, by a power analyzer circuit, the digital signal, in order to generate a detection signal for controlling the compensation circuit.

18. The signal detection method of claim 17, further comprising:
amplifying, by an amplifier, the fourth processed signal, wherein the analog-to-digital converter is further configured to generate the digital signal according to the amplified fourth processed signal.

19. The signal detection method of claim 17, wherein the output signal comprises a signal component having a baseband frequency, and a bandwidth of the analog-to-digital converter is lower than a double of the baseband frequency.

20. The signal detection method of claim 17, wherein the second filter is a low-pass filter.

* * * * *